United States Patent [19]

Sasagawa et al.

[11] Patent Number: 4,632,969
[45] Date of Patent: * Dec. 30, 1986

[54] RESIN FOR HIGH-REFRACTIVITY LENSES

[75] Inventors: Katsuyoshi Sasagawa; Masao Imai; Kimio Kanno, all of Yokohama, Japan

[73] Assignee: Mitsui Toatsu Chemicals, Inc., Tokyo, Japan

[*] Notice: The portion of the term of this patent subsequent to Jun. 11, 2002 has been disclaimed.

[21] Appl. No.: 598,321

[22] PCT Filed: Jul. 7, 1983

[86] PCT No.: PCT/JP83/00219
§ 371 Date: Mar. 2, 1984
§ 102(e) Date: Mar. 2, 1984

[30] Foreign Application Priority Data

Nov. 25, 1982 [JP] Japan .................... 57-205451

[51] Int. Cl.$^4$ .................... C08F 220/22; C08F 228/02
[52] U.S. Cl. .................... 526/286; 350/409; 351/159
[58] Field of Search .................... 526/292.4, 286, 293

[56] References Cited

U.S. PATENT DOCUMENTS 4,522,993 6/1985 Sasagawa .................... 526/292.4

Primary Examiner—Christopher Henderson
Attorney, Agent, or Firm—Fisher, Christen & Sabol

[57] ABSTRACT

Disclosed herein are a resin for high-refractivity lenses, formed by copolymerizing at least one unifunctional monomer selected from the group of compounds represented by the following general formula (I);

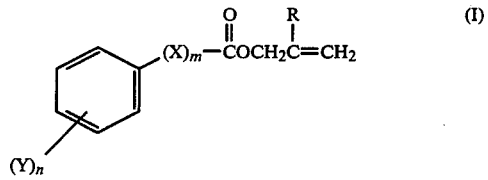

wherein X means a oxygen or sulfur atom, Y denotes a chlorine or bromine atom, R is a hydrogen atom or a methyl group, m is 0 or 1 and n stands for an integer of 1–5 with at least one bifunctional monomer selected from the group of compounds represented by the following general formula (II);

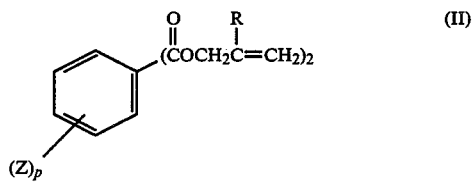

wherein Z is a hydrogen, chlorine or bromine atom, R means a hydrogen atom or a methyl group and p stands for an integer 1–4 as well as high-refractivity lenses made of such a resin. The lens-making resin according to this invention features a high refractive index, excellent processability such as superb grinding processability and high impact resistance, especial outstanding miscibility between the unifunctional monomer and bifunctional monomer upon copolymerization thereof, owing to the similarity of the molecular structure between the unifunctional monomer and the bifunctional monomer. Accordingly, it barely results in development of polymerization strain upon copolymerization thereof.

3 Claims, No Drawings

RESIN FOR HIGH-REFRACTIVITY LENSES

TECHNICAL FIELD

This invention relates to a lens-making resin having a high refractive index and a lens made of the above resin.

BACKGROUND ART

Plastic lenses have found increasing commercial utility as eyeglass lenses, camera lenses and other optical lenses in recent years, since they are lighter in weight and less fragile in comparison with inorganic glass lenses. As a resin which is currently used in a large volume for the above application, there is a resin obtained by the casting-polymerization of diethylene glycol bisallylcarbonate (hereinafter called "CR-39"). However, although the above resin has many excellent optical characteristics, the refractive index ($n_d$) of the resin is 1.50, which is smaller compared with those of inorganic glass lenses ($n_d$=about 1.52). As resins having high refractive indexes, there have already been known polycarbonate ($n_d$=1.58−1.59), polystyrene ($n_d$=1.58−1.60), etc. These resins are each a two-dimensional polymer structurally and thermoplastic. They are thus unsuitable for casting-polymerization method which is suitable for production of articles in various models such as fabrication of eyeglass lenses, and their post-molding processings, especially, their rough-grinding and smoothing (hereinafter merely referred to as "grinding") work is difficult, because it make diamond-made grindstones loaded. Therefore, use cf these resins are presently limited to some sort of safety eyeglasses and the like which do not need grinding work.

Accordingly, there is a strong desire for the development of a lens-making resin which has a refractive index higher than that of the lens-making resin prepared by polymerizing CR-39, has an excellent post-molding processability similar to CR-39 owing to its three-dimensional crosslinking structure when polymerized. A variety of researches has already been carried out with a view toward developing a resin which would meet the above-mentioned desire, resulting in proposals of resins obtained by copolymerizing CR-39 and second monomers having refractive indexes higher than that of CR-39 when measured as their respective homopolymers (see, Japanese Patent Laid-open Nos. 79353/1976, 7787/1978, 77686/1979, 15118/1980 and 36601/1981). The refractive indexes of the thus-copolymerized resins are however inherently limited because they employ CR-39 as their principal components. It was thus difficult to obtain a resin having a high refractive index, for example, a refractive index of 1.55 or higher.

In order to obtain a resin having a still higher refractive index, it is urged to use a bifunctional monomer which can afford a homopolymer having a refractive index higher than that of CR-39. However, each of bifunctional monomers which have been proposed to date resulted in a polymer having impact resistance much poorer compared with the homopolymer of CR-39 when polymerized singly. Thus, some attempts have been made to improve the impact resistance of these bifunctional monomers by copolymerizing them with a unifunctional monomer. Here, each matching unifunctional monomer is required to have a high refractive index when measured as its homopolymer if one wants to obtain a copolymer having a high refractive index. For this reason, styrene or a halogen-substituted styrene is presently used as such a unifunctional monomer. However, use of bifunctional monomers different from CR-39, which have heretofore been proposed, in combination with the styrenes as unifunctional monomers is accompanied by such drawbacks that it tends to result in development of polymerization strain and is difficult to obtain polymers having uniform refractivity distribution because there are considerable differences in polymerization reactivity between such bifunctional monomers and the styrenes and the proportions of the bifunctional monomers and the styrenes cannot be varied freely due to poor miscibility therebetween.

With the foregoing in view, the present inventors carried out an extensive research with a view toward making improvements to the above-described drawbacks. As a result, it has been found that a resin, which has a high refractive index and excellent processability such as grinding processability and superb impact resistance, exhibits excellent miscibility between its starting unifunctional monomer and bifunctional monomer upon copolymerization thereof, is less susceptible of developing polymerization strain and is thus suitable for use in the production of high-refractivity lenses, can be obtained by copolymerizing a specific unifunctional monomer and a bifunctional monomer, leading to completion of this invention.

DISCLOSURE OF THE INVENTION

This invention therefore provides a resin for high-refractivity lenses, formed by copolymerizing at least one unifunctional monomer represented by the following general formula (I):

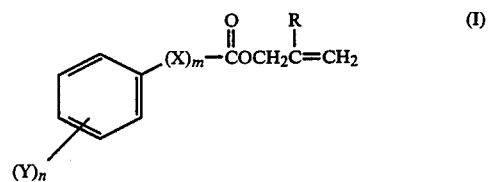

wherein X means a oxygen or sulfur atom, Y is a chlorine or bromine atom, R denotes a hydrogen atom or a methyl group, m stands for 0 or 1 and n means an integer of 1–5 with at least one bifunctional monomer represented by the following general formula (II):

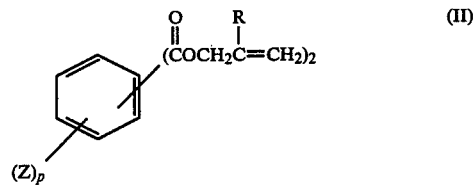

wherein Z means a hydrogen, chlorine or bromine atom, R is a hydrogen atom or a methyl group and p means an integer of 1–4.

Resins according to this invention, contain the following structural units represented by the following general formula (III) and (IV):

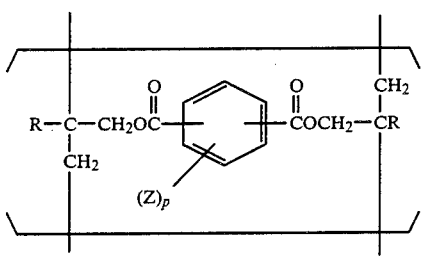

(III)

wherein Z, R and p mean the same meanings defined in the general formula (II); and

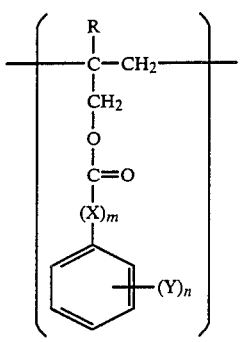

(IV)

wherein X, Y, R, m and n denote the same meanings defined in the general formula (I). This invention also provides lenses made of such a resin.

Lens-making resin according to this invention features a high refractive index, excellent processability such as superb grinding processability and high impact resistance, especial outstanding miscibility between the unifunctional monomer and bifunctional monomer upon copolymerization thereof, owing to the similarity of the molecular structure between the unifunctional monomer and the bifunctional monomer. Accordingly, it barely results in development of polymerization strain upon copolymerization thereof.

BEST MODE FOR CARRYING OUT THE INVENTION

Among the compounds represented by the general formula (I) according to the present invention, allyl or β-methylallyl ester of nucleus-halogenated benzoic acid can be obtained by the reaction of the acid chloride of the corresponding nucleus-halogenated benzoic acid and allyl or β-methylallyl alcohol in the presence of a hydrochloric acid acceptor such as triethylamine or sodium carbonate. Allyl or β-methylallyl carbonates of nucleus-halogenated phenol and nucleus-halogenated thiophenol represented by the general formula (I) can also be obtained by reacting each of the nucleus halogenated phenol and nucleus halogenated thiophenol with allyl or β-methylallyl chloroformate in the presence of a hydrochloric acid acceptor such as triethylamine or sodium carbonate.

Among thus-obtained compounds represented by the general formula (I), specific examples of allyl or β-methylallyl ester of nucleus-halogenated benzoic acid are; allyl or β-methylallyl 2-chlorobenzoate, 3-chlorobenzoate, 4-chlorobenzoate, 2,4-dichlorobenzoate, 2,5-dichlorobenzoate, 2,6-dichlorobenzoate, 3,4-dichlorobenzoate, 3,5-dichlorobenzoate, 2,3,6-trichlorobenzoate, pentachlorobenzoate, 2-bromobenzoate and 3-bromobenzoate. As allyl or β-methylallyl carbonates of nucleus-halogenated phenols, may be mentioned; allyl or β-methylallyl carbonates of 2-chlorophenol, 3-chlorophenol, 4-chlorophenol, 2,3-dichlorophenol, 2,4-dichlorophenol, 2,5-dichlorophenol, 2,6-dichlorophenol, 3,4-dichlorophenol, 3,5-dichlorophenol, 2,4,5-trichlorophenol, 2,4,6-trichlorophenol, 2,3,4,6-tetrachlorophenol, pentachlorophenol, 2bromophenol, 3-bromophenol, 4-bromophenol, 2,4-dibromophenol, 2,4,6-tribromophenol, pentabromophenol and as allyl or β-methylallyl carbonates of nucleus-halogenated thiophenols, may be mentioned; allyl or β-methylallyl carbonates of 2,3-dichlorothiophenol, 2,5-dichlorothiophenol, 3,5-dichlorothiophenol, 2,3,6trichlorothiophenol, 2,4,5-trichlorothiophenol, 2,3,5,6-tetrachlorothiophenol, pentachlorothiophenol, 2-bromothiophenol, 2,4-dibromothiophenol, and 2,4,6-tribromothiophenol.

Among the compounds represented by the general formula (II) according to the present invention, specific examples of diester of benzene dicarboxylic acid and nucleus-halogenated benzene dicarboxylic acid are; diallyl esters and bis(β-methylallyl)esters of terephthalic acid, isophthalic acid, phthalic acid, 2,4-dichloroterephthalic acid, tetrachloroterephthalic acid, tetrachlorophthalic acid, 2,4-dibromoterephthalic acid, tetrabromoterephthalic acid and tetrabromophthalic acid.

Among the above-mentioned esters represented by the general formula (II), those represented by the following general formula (V):

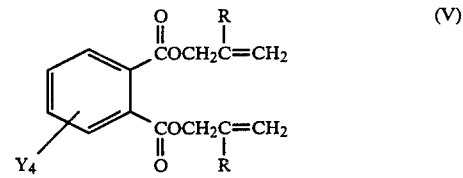

(V)

wherein Y means a chlorine or bromine atom and R denotes a hydrogen atom or a methyl group are particularly preferred in view of the refractive indexes of resulting resins and their miscibility with unifunctional monomers upon their copolymerization. As specific examples of these preferred esters, may be mentioned bisallyl tetrachlorophthalate, bis(β-methylallyl) tetrachlorophthalate, bisallyl tetrabromophthalate and bis(β-methylallyl) tetrabromophthalate.

In the present invention, the proportion of at least one monomer selected from the group of compounds represented by the above general formula (I) in the copolymerization with compound(s) represented by the general formula (II) may not be specified generally because its preferred proportion may vary depending on the type of the monomer. However, the monomer of the general formula (I) may be used at a proportion of 20–90% by weight or preferably 30–90% by weight. If the monomer is incorporated at any proportion lower than 20% by weight, the resultant, copolymerized resin will have an extremely lowered impact resistance. Any proportions in excess of 90% by weight are not preferred because the surface hardness of the resultant resin will be greatly lowered. Accordingly, at least one bifunctional monomer represented by the general formula (II) is used at a proportion of 10–80% by weight.

Furthermore, no particular limitation is vested on the type of a radical polymerization initiator which is to be used upon conducting a copolymerization so as to obtain a lens-making resin according to this invention. It is thus preferable to use, at a proportion of 0.01–5% by weight, a conventional peroxide such as benzoyl peroxide, p-chlorobenzoyl peroxide, diisopropyl peroxycarbonate, di-2-ethyl-hexyl peroxycarbonate or tertiary butyl peroxypivalate or a known azo compound such as azobisisobutyronitrile.

The lens-making resin according to this invention can be prepared by subjecting a mixture of at least one unifunctional monomer selected from the group of compounds represented by the general formula (I), at least one bifunctional monomer selected from the group of compounds represented by the general formula (II) and a radical polymerization initiator to the known casting-polymerization method, in other words, pouring the mixture into a mold formed of a gasket or spacer and a glass-made or metallic mold and polymerizing and hardening the mixture by heating it or irradiating ultraviolet rays to the mixture. Here, it may be possible to incorporate one or more appropriate additives such as ultraviolet stabilizer, antioxidant, coloring inhibitor, fluorescent dye and/or the like to the mixture prior to its polymerization as needed.

The thus-obtained lens-making resin according to this invention is colorless and transparent and has a high refractive index, excellent processability such as superb grinding processability and outstanding impact resistance; it can thus be preferably used for eyeglass lenses, camera lenses and other optical elements.

Some examples of this invention will hereinafter be described, in which all designations of "part" or "parts" mean part or parts by weight and all designations of "%" mean % by weight. Incidentally, the following testing methods were employed to determine the refractive indexes, grinding processability, impact resistance and extents of yellowing upon exposure to ultraviolet rays of the lens-making resins obtained in the examples.

Refractive Indexes:
Measured at 20° C. by an Abbe refractometer.
Processability:
Each molded lens blank was ground by a grinding machine designed to process eyeglass lenses. Samples bearing smooth ground surfaces were judged acceptable and marked by circles ( ○ ).

Impact Resistance:
A falling ball impact test was carried out in accordance with the FDA standards on planar plates having the thickness of 2 mm at their centers. Unbroken samples were judged as acceptable and marked by circles ( ○ ).

Ultraviolet Resistance Test:
Lens samples were placed in a Weather-O-Meter equipped with a Sunshine carbon arc-lamp. After an elapsed time of 200 hours, the lens samples were taken out of the Weather-O-Meter and their hues were compared with their hues prior to the testing in the Weather-O-Meter. Results were evaluated and marked as follows:

○ . . . Unchanged.
Δ . . . Slightly yellowed.
X . . . Yellowed.

SYNTHESIS EXAMPLE 1:

Sixty parts of allyl alcohol were dissolved in 240 parts of chloroform, followed by an addition of 105 parts of triethylamine. While stirring the resultant mixture at 10°–15° C., 175 parts of o-chlorobenzoyl chloride were added dropwise over 2 hours. After the resultant mixture was heated at 45°–50° C. for 3 hours, the liquid reaction mixture was poured in a separation funnel and washed first with dilute hydrochloric acid and then with water. The thus-formed light-yellowish organic layer was dried with calcium chloride and then treated with activated carbon. After driving chloroform off, the residue was distilled under reduced pressures to obtain 153 parts of allyl o-chlorobenzoate (hereinafter called "Compound A"; b.p. 101° C./3.5 mmHg).

Elementary analysis: Calculated for $C_{10}H_9O_2Cl$: C, 61.10; H, 4.61; Cl, 18.03. Found: C, 61.18; H, 4.60; Cl, 17.82. NMR $\delta CDCl_3$ 7.60 (4H, m), 6.00 (1H, m), 5.32 (2H, t), 4.82 (2H, d).

SYNTHESIS EXAMPLES 2-12

Following the procedures of Synthesis Example 1, were synthetically prepared the unifunctional monomers given in Table 1.

TABLE 1

| Synthesis Example | Structural Formula | Compound Symbol | Boiling Point (°C./mmHg) | C % | H % | Halogen % | NMR $\delta CDCl_3$ |
|---|---|---|---|---|---|---|---|
| 2 | Cl-C₆H₄-COCH₂CH=CH₂ (ortho) | B | 99/3.5 | 61.15 (61.10) | 4.59 (4.61) | 17.93 (18.03) | 7.60(4H,m), 6.00(1H,m) 5.32(2H,t), 4.82(2H,d) |
| 3 | Cl-C₆H₄-COCH₂CH=CH₂ (para) | C | 98/3.5 | 61.21 (61.10) | 4.59 (4.61) | 17.88 (18.03) | 7.60(4H,m), 6.04(1H,m) 5.32(2H,t), 4.76(2H,d) |
| 4 | Cl-C₆H₄-COCH₂C(CH₃)=CH₂ | D | 97/3.5 | 62.75 (62.72) | 5.17 (5.26) | 16.56 (16.83) | 7.55(4H,m), 5.33(2H,t) 4.80(2H,d), 1.65(3H,s) |
| 5 | Cl₂-C₆H₃-COCH₂CH=CH₂ | E | 135/7.0 | 51.77 (51.98) | 3.51 (3.49) | 30.59 (30.68) | 7.48(3H,m), 6.04(1H,m) 5.36(2H,t), 4.80(2H,d) |

TABLE 1-continued

| Synthesis Example | Structural Formula | Compound Symbol | Boiling Point (°C./mmHg) | C % | H % | Halogen % | NMR δCDCl₃ |
|---|---|---|---|---|---|---|---|
| 6 | Cl-C₆H₃(Cl)-OCOCH₂CH=CH₂ | F | 123/3.0 | 48.53 (48.61) | 3.19 (3.26) | 28.73 (28.70) | 7.28(3H,d), 5.92(1H,m) 5.28(2H,t), 4.68(2H,d) |
| 7 | Cl-C₆H₂(Cl)(Cl)-OCOCH₂CH=CH₂ | G | 126/3.0 | 42.37 (42.66) | 2.61 (2.50) | 37.23 (37.78) | 7.32(2H,s), 5.95(1H,m) 5.30(2H,t), 4.75(2H,d) |
| 8 | Cl-C₆H₂(Cl)(Cl)-OCOCH₂C(CH₃)=CH₂ | H | 125/3.0 | 44.65 (44.70) | 3.10 (3.07) | 35.73 (35.99) | 7.28(2H,s), 5.29(2H,t) 4.75(2H,d), 1.64(3H,s) |
| 9 | Cl₅C₆-OCOCH₂CH=CH₂ | I | 166/3.0 | 34.52 (34.28) | 1.29 (1.44) | 49.87 (50.59) | 6.04(1H,m), 5.44(2H,m) 4.82(2H,d) |
| 10 | Br-C₆H₄-OCOCH₂CH=CH₂ | J | 122/3.0 | 46.28 (46.72) | 3.53 (3.53) | 31.00 (31.08) | 7.20(4H,m), 5.88(1H,m) 5.24(2H,t), 4.64(2H,d) |
| 11 | Br-C₆H₂(Br)(Br)-OCOCH₂CH=CH₂ | K | 164/3.0 | 28.87 (28.95) | 1.65 (1.70) | 56.88 (57.78) | 7.68(2H,s), 5.96(1H,m) 5.35(2H,t), 4.76(2H,d) |
| 12 | Cl-C₆H₂(Cl)(Cl)-SCOCH₂CH=CH₂ | L | 164/3.5 | 34.20 (33.91) | 0.87 (0.95) | 49.88 (50.05) | 7.68(2H,d), 5.95(1H,m) 5.36(2H,t), 4.76(2H,d) |

Note:
Figures in brackets ( ) in Elementary Analysis Data are values calculated.

EXAMPLE 1

A liquid mixture, which had been obtained by heating a mixture of 50 parts of allyl o-chlorobenzoate and 50 parts of diallyl tetrachlorophthalate to 75° C., was maintained at 60° C., followed by an addition of 0.3 part of benzoyl peroxide. The thus-prepared mixture was poured into a mold which was formed of a glass mold and a polyethylene gasket and preheated to 60° C. in advance. It was held at 60° C. for 24 hours, at 80° C. for 2 hours and at 100° C. for 2 hours to carry out the copolymerization of the contents. The thus-formed resin was next taken out of the mold, on which a refractivity measurement, processability test, impact resistance test and ultraviolet resistance test were conducted. As results of such a measurement and tests, it was found that the thus-obtained colorless transparent lens had the refractive index of 1.597 and good grinding processability, impact resistance and ultraviolet ray resistance.

EXAMPLES 2-12

In the same manner as in Example 1, monomers were copolymerized at different proportions to prepare lenses. Results are shown in Table 2, together with results of Comparative Examples 1-4.

TABLE 2

| | Monomer Composition (part) | | Refractive Index $n_d^{20}$ | Grinding Processability | Impact Resistance | Ultraviolet Resistance Test |
|---|---|---|---|---|---|---|
| Example 1 | Compound A/TCPDA | (50/50) | 1.597 | ○ | ○ | ○ |
| Example 2 | Compound B/TCTPDA | (50/50) | 1.594 | ○ | ○ | ○ |
| Example 3 | Compound C/TBPDA | (70/30) | 1.598 | ○ | ○ | ○ |
| Example 4 | Compound D/TCPDA | (50/50) | 1.586 | ○ | ○ | ○ |
| Example 5 | Compound E/DBTPDA | (70/30) | 1.593 | ○ | ○ | ○ |
| Example 6 | Compound F/TBTPDA | (70/30) | 1.584 | ○ | ○ | ○ |
| Example 7 | Compound G/TCPDA | (50/50) | 1.588 | ○ | ○ | ○ |
| Example 8 | Compound H/TBTPDA | (50/50) | 1.587 | ○ | ○ | ○ |
| Example 9 | Compound I/TBTPDA | (50/50) | 1.603 | ○ | ○ | ○ |
| Example 10 | Compound J/TBPDA | (70/30) | 1.586 | ○ | ○ | ○ |

TABLE 2-continued

| | Monomer Composition (part) | | Refractive Index $n_d^{20}$ | Grinding Processability | Impact Resistance | Ultraviolet Resistance Test |
|---|---|---|---|---|---|---|
| Example 11 | Compound K/DAP | (70/30) | 1.609 | ○ | ○ | ○ |
| Example 12 | Compound L/DAP | (70/30) | 1.611 | ○ | ○ | ○ |
| Comparative Example 1 | CR-39 | (100) | 1.498 | ○ | ○ | ○ |
| Comparative Example 2 | Styrene/CR-39 | (50/50) | 1.543 | ○ | ○ | Δ |
| Comparative Example 3 | o-ClSt/CR-39 | (50/50) | 1.554 | ○ | ○ | X |
| Comparative Example 4 | Styrene/TCPDA | (50/50) | 1.596 | X | X | Δ |

The names of the compounds represented by the code addresses in the column of Monomer Composition in Table 2 are shown as follows:
TCPDA: Diallyl tetrachlorophthalate
TCTPDA: Diallyl tetrachloroterephthalate
TBPDA: Diallyl tetrabromophthalate
TBTPDA: Diallyl tetrabromoterephthalate
DBTPDA: Diallyl 2,5-dibromoterephthalate
DAP: Diallyl phthalate
o-ClSt: o-Chlorostyrene

REFERENTIAL EXAMPLE 1

In order to compare the miscibility between a bifunctional monomer useful in the practice of this invention and various unifunctional monomers, diallyl tetrachloroterephthalate was chosen as the bifunctional monomer. Diallyl tetrachloroterephthalate and each of various unifunctional monomers were mixed at the weight ratio of 2:1 and heated into the state of a perfect solution. Thereafter, the resultant mixture was retained for 2 hours in a constant temperature bath maintained at 60° C. Each sample was obserbed whether any crystals were allowed to precipitate or not.
Results are shown in Table 3.

TABLE 3

| Unifunctional Monomer | Crystals |
|---|---|
| Compound A | Not precipitated |
| Compound E | Not precipitated |
| Compound F | Not precipitated |
| Compound G | Not precipitated |
| Compound I | Not precipitated |
| Compound J | Not precipitated |
| Compound K | Not precipitated |
| Compound L | Not precipitated |
| Phenylacrylate | Precipitated |
| Styrene | Precipitated |

We claim:

1. A resin for high-refractivity lenses, formed by copolymerizing by heating in the presence of a radial polymerization initiator 20 to 90 weight percent of at least one unifunctional monomer selected from the group of compounds represented by the following general formula (I):

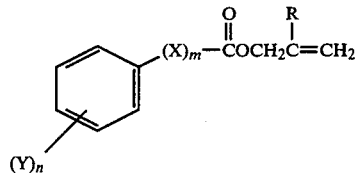

wherein X means an oxygen or sulfur atom, Y denotes a chlorine or bromine atom, R is a hydrogen or a methyl group, m is 0 or 1 and n stands for an integer of 1–5, with 10 to 80 weight percent of at least one bifunctional monomer selected from the group of compounds represented by the following general formula (II):

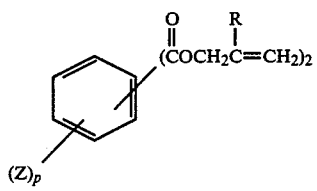

wherein Z is a hydrogen, chlorine or bromine atom, R means a hydrogen atom or a methyl group and p stands for an integer of 1–4.

2. A resin according to claim 1, wherein the bifunctional monomer is a monomer represented by the following general formula (V):

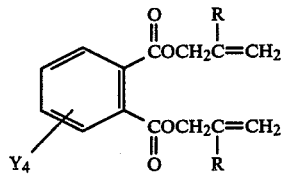

in which Y means a chlorine or bromine atom and R denotes a hydrogen atom or a methyl group.

3. A resin according to claim 2, wherein the unifunctional monomer is allyl o-chlorobenzoate and the bifunctional monomer is diallyl tetrachlorophthalate.